United States Patent
Guellueck et al.

(10) Patent No.: US 9,709,125 B2
(45) Date of Patent: Jul. 18, 2017

(54) VIBRATION DAMPER

(71) Applicant: Schaeffler Technologies AG & Co. KG, Herzogenaurach (DE)

(72) Inventors: Toros Guellueck, Lichtenau (DE); Stephan Maienschein, Baden-Baden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/651,136

(22) PCT Filed: Nov. 28, 2013

(86) PCT No.: PCT/DE2013/200323
§ 371 (c)(1),
(2) Date: Jun. 10, 2015

(87) PCT Pub. No.: WO2014/094762
PCT Pub. Date: Jun. 26, 2014

(65) Prior Publication Data
US 2015/0323039 A1    Nov. 12, 2015

(30) Foreign Application Priority Data
Dec. 21, 2012   (DE) .......................... 10 2012 224 219

(51) Int. Cl.
*F16F 15/121* (2006.01)
*F16F 15/131* (2006.01)
*F16F 7/116* (2006.01)
*F16F 15/14* (2006.01)

(52) U.S. Cl.
CPC ........ *F16F 15/13128* (2013.01); *F16F 7/116* (2013.01); *F16F 15/145* (2013.01)

(58) Field of Classification Search
CPC ..... F16F 15/13128; F16F 15/145; F16F 7/116
USPC ................ 464/3–6, 68.2; 192/201; 74/574.2
See application file for complete search history.

(56) References Cited

U.S. PATENT DOCUMENTS

| 5,634,866 A | 6/1997 | Sudau |
| 8,919,506 B2 | 12/2014 | Loew et al. |
| 2012/0080280 A1* | 4/2012 | Takikawa ................ F16H 45/02 |
| 2013/0305876 A1 | 11/2013 | Schnaedelbach et al. |

(Continued)

FOREIGN PATENT DOCUMENTS

| CN | 1109563 | 10/1995 |
| CN | 101225865 | 7/2008 |
| CN | 102667229 | 9/2012 |

(Continued)

*Primary Examiner* — Gregory Binda
(74) *Attorney, Agent, or Firm* — Davidson, Davidson & Kappel, LLC

(57) ABSTRACT

A vibration damper includes an input side and output side, one or more elastic elements for transmitting force between the input side and the output side, and a centrifugal force pendulum having a pendulum flange and one or more pendulum masses which are attached movably to the pendulum flange in the plane of rotation of the pendulum flange. It is proposed that certain ratios of masses and volumes of the elastic elements and of the pendulum masses be formed. If one or more of the ratios lie in specified ranges, then good damping or elimination of torsional vibrations by the vibration damper can be assumed.

11 Claims, 4 Drawing Sheets

(56) References Cited

U.S. PATENT DOCUMENTS

2015/0005078 A1* 1/2015 Sekiguchi ............... F16H 45/02
2015/0369332 A1* 12/2015 Wickel .................... F16D 3/12

FOREIGN PATENT DOCUMENTS

| CN | 102792055 | 11/2012 |
| DE | 102009053482 | 9/2010 |
| WO | WO2012/089190 | 7/2012 |

* cited by examiner

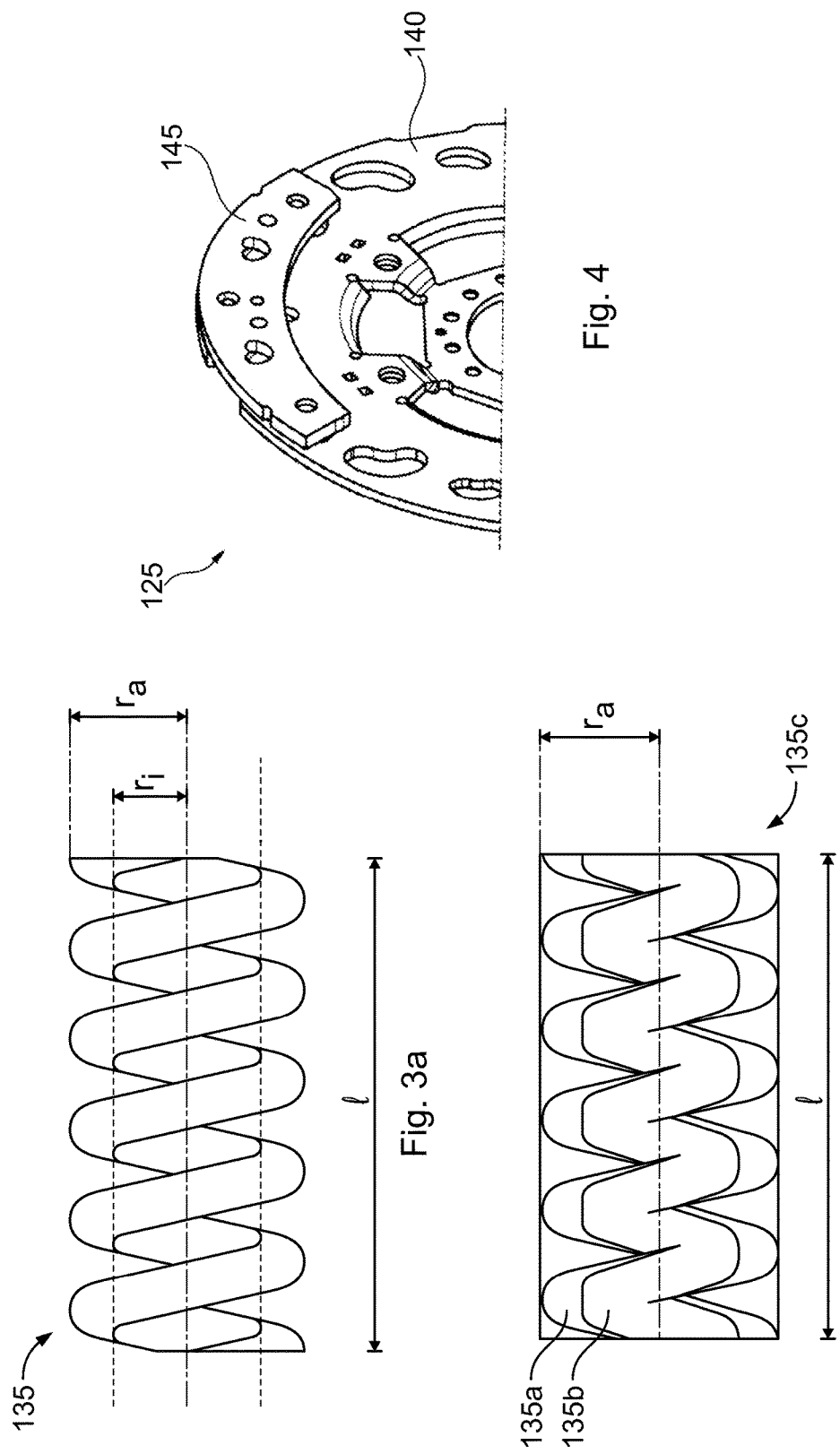

VIBRATION DAMPER

The invention relates to a vibration damper for transmitting a torque between an input side and an output side. In particular, the invention relates to a vibration damper having an elastic element and a centrifugal force pendulum.

A vibration damper may be used to transmit torque in a drivetrain, for example in a motor vehicle. The vibration damper may be placed, for example, between a drive motor and a gear unit. In particular, when the drive motor comprises a reciprocating internal combustion engine, fluctuations are superimposed on the torque provided, which are to be reduced by the vibration damper and kept away from the gear unit. The vibration damper is usually constructed so that torque fluctuations which may be impressed on a flow of torque in the reverse direction are also reduced or isolated.

BACKGROUND

A known vibration damper comprises an elastic element and a centrifugal force pendulum. The elastic element is usually formed by a cylindrical or arciform coil spring, which transmits forces between the input side and the output side of the vibration damper on a circumference around an axis of rotation. The centrifugal force pendulum comprises one or more pendulum masses, which are situated movably on a pendulum flange in the plane of rotation of the pendulum flange. The pendulum flange is connected, rigidly or by means of an elastic element, to the input side or the output side.

SUMMARY OF THE INVENTION

It has been found that not every combination of elastic elements and pendulum masses results in adequate isolation or elimination of vibrations. An object of the invention is to specify criteria which simplify the dimensioning of an elastic element and of a centrifugal force pendulum in a vibration damper.

The present invention provides a vibration damper having an input side and output side, one or more elastic elements for transmitting force between the input side and the output side, and a centrifugal force pendulum having a pendulum flange and one or more pendulum masses which are attached movably to the pendulum flange in the plane of rotation of the pendulum flange.

Experiments have shown that good isolation of vibrations can succeed when the ratio of the sum of the masses of the pendulum masses and the sum of the masses of the elastic elements lies in a range between 0.5 and 4.

By adjusting the masses of the pendulum masses relative to the masses of the elastic elements, an especially efficient combination of isolating the torsional vibrations by means of the elastic elements and eliminating the torsional vibrations by means of the centrifugal force pendulum can be achieved. In an especially preferred embodiment, the forenamed ratio lies in the range between 0.95 and 1.60.

Starting from the vibration damper described above, other parameters than the masses of the elastic elements and the pendulum masses can also be considered. If one of the elastic elements includes a cylindrical spring, for example, then a solid cylinder may be specified within which the cylindrical spring extends. If one of the elastic elements includes a bow spring, for example, then in an analogous manner a solid torus sector may be specified within which the bow spring extends. It has been found that especially good vibration damping or eliminating properties of the vibration damper can be achieved when the ratio of the sum of the volumes of the pendulum masses and the sum of the volumes of the solid cylinders and solid torus sectors lies in a range between 0.3 and 1.3. The forenamed ratio preferably lies in a range between 0.44 and 0.63.

By considering the volumes of geometric bodies that envelop the elastic elements or enclose them as tightly as possible, constructions in particular may be taken into account in which the space of the geometric body is essentially completely filled by the elastic element. This point of view suggests itself in particular in embodiments in which another straight or bent coil spring is situated inside the straight or bent coil spring.

If it can be assumed that the elastic elements are formed by coil springs on whose radially inner side no additional elastic element is constructed, then hollow cylinders can be considered instead of the solid cylinders described above, and hollow torus sectors instead of the described solid torus sectors. In this case, it is preferred that the ratio of the sum of the volumes of the pendulum masses and the sum of the volumes of the hollow cylinders and hollow torus sectors are in the range between 0.5 and 4. In an especially preferred embodiment, the forenamed ratio is in a range between 0.97 and 1.94.

Another approach to characterizing a high-quality vibration damper of the described type consists in setting the ratio of masses named at the beginning and the last-named ratio of the volumes of the pendulum masses and the hollow cylinders and hollow torus sectors in another ratio. This ratio falls in a range between 0.35 and 2. In an especially preferred embodiment, the ratio lies in a range between 0.72 and 1.05.

The ranges according to the invention for predetermined ratios make it possible to estimate the quality of the vibration damping of an existing vibration damper mathematically. Alternatively, it is also possible when designing a vibration damper to proceed in such a way that at least one of the forenamed ratios lies within the respective assigned range in order to provide a high-quality vibration damper. In both cases, one or more of the stated criteria may be used in order to identify the high-quality vibration damper according to the invention.

BRIEF DESCRIPTION OF THE DRAWINGS

The invention will now be described in greater detail by reference to the accompanying figures, in which the figures represent the following:

FIG. 1c a vibration damper shown in FIG. 1a;

FIGS. 3a and 3b cylindrical springs for use on the vibration damper of FIG. 1;

FIG. 4 a cylindrical force pendulum for use on the vibration damper of FIG. 1.

DETAILED DESCRIPTION

Figure 1A:
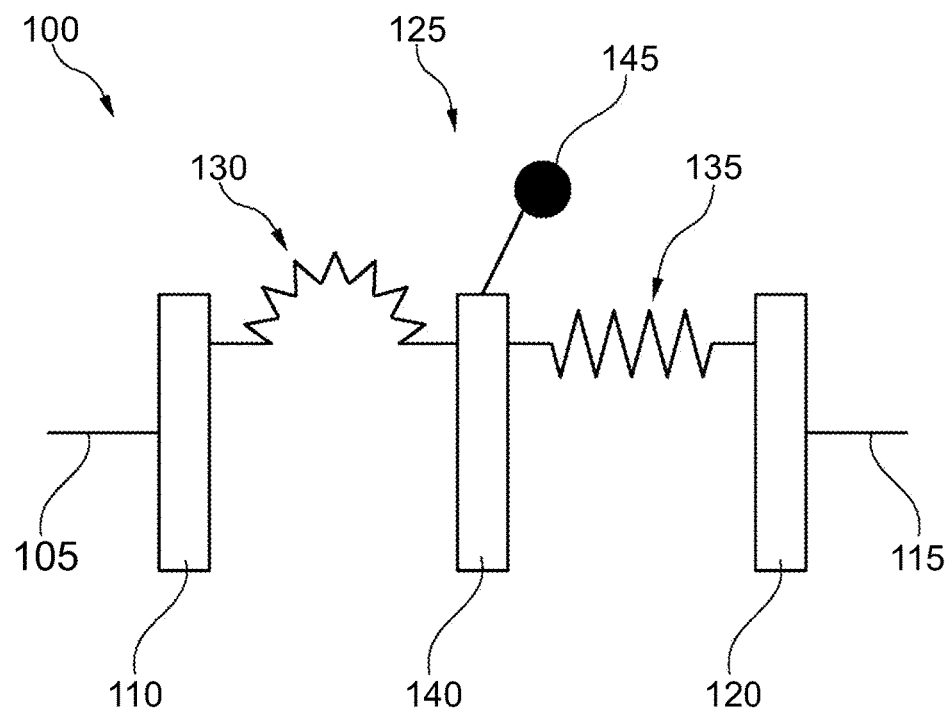
FIGS. 1a and 1b schematic depictions of a vibration damper.
Figure 1B:
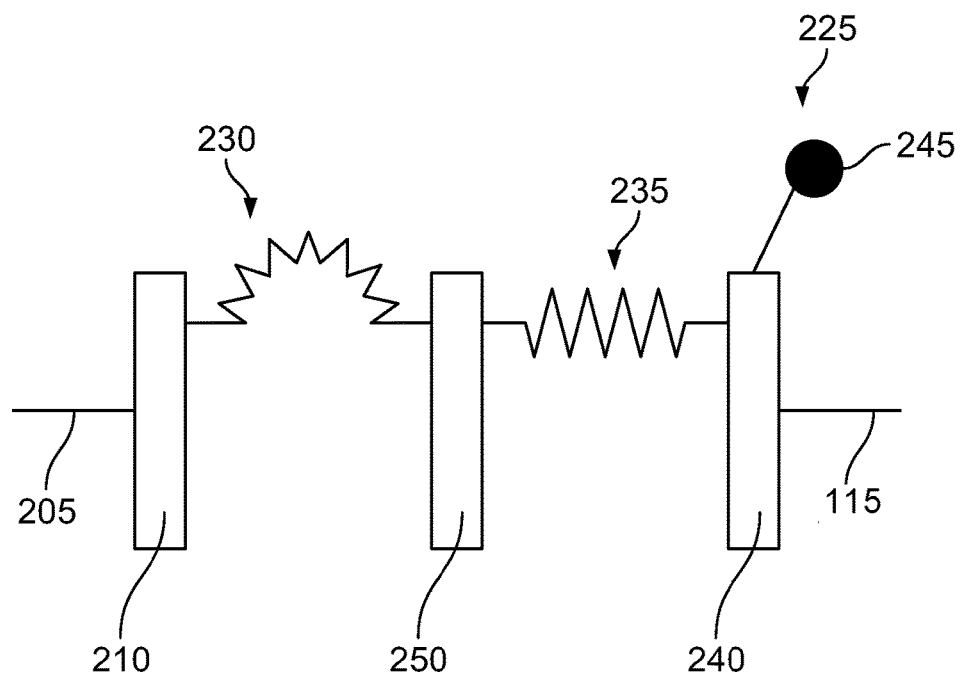

FIGS. 1a and 1b show schematic depictions of two embodiments of a vibration damper 100. The vibration damper is set up, for example, to be used in a drivetrain of a motor vehicle. In particular, the vibration damper 100 is set up to be used on a wet or dry clutch, for example a starting clutch, on a hydrodynamic converter, a torque converter, a dual clutch or an automatic transmission.

The vibration damper 100 in FIG. 1a comprises an input side 105 which is connected as an example to an input flange 110, an output side 115 which is connected as an example to an output flange 120, a centrifugal force pendulum 125, and a first elastic element 130 and a second elastic element 135. The centrifugal force pendulum 125 includes a pendulum flange 140, on which a pendulum mass 145 is movably situated. The pendulum flange 140 is rotatably mounted, preferably around the same axis of rotation around which the input side 105 with the input flange 110 and the output side 115 with the output flange 120 are also rotatably mounted. The first elastic element 130 couples the input flange 110 with the pendulum flange 140, and the second elastic element 135 couples the pendulum flange 140 with the output flange 120.

In the depicted embodiment, the first elastic element 130 comprises a bow spring and the second elastic element 135 comprises a cylindrical spring. In other embodiments, the first elastic element 130 may also comprise a cylindrical spring and the second elastic element 135 a bow spring. Both elastic elements 130, 135 are situated on a circumference around the axis of rotation of the pendulum flange. Compression springs are preferably used for the elastic elements 130, 135, which compression springs are situated on the flanges 110 and 140 or 120 and 140 in such a way that both a positive and a negative rotation of the flanges 110, 120, 140 meshing with the respective elastic element 130, 135 result in compression of the elastic element 130, 135. The flanges 110, 120, 140 usually have congruent cut-outs for this purpose, in which the elastic elements 130, 135 are situated.

The elastic elements 130 and 135 can overlap each other axially, in which case one of the elastic elements 130, 135 is situated further inside radially than the other radial element 130, 135. Especially preferred is an embodiment in which a bow spring is used radially outside and a cylindrical spring radially inside.

Figure 1C:
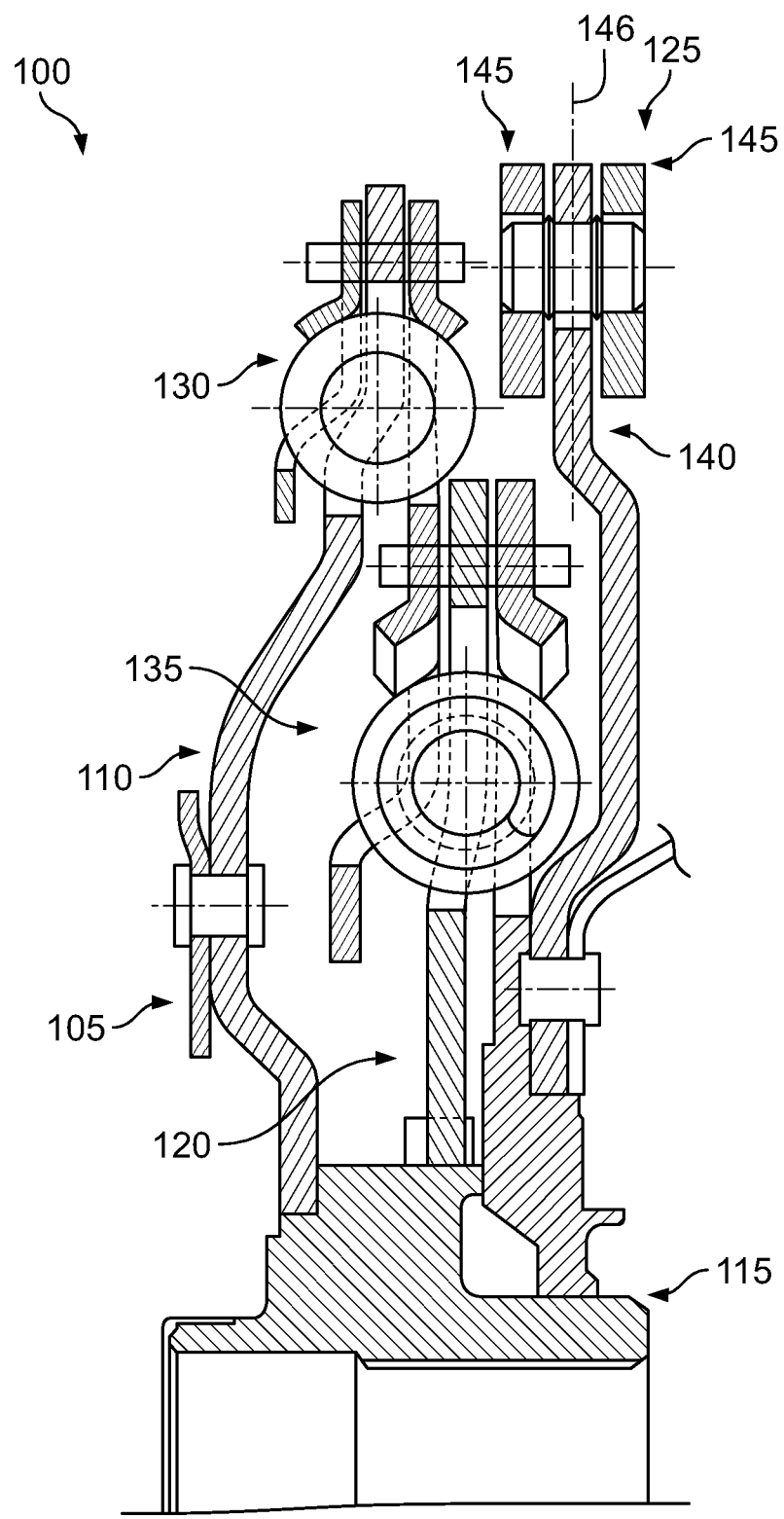

FIG. 1c depicts a side view of vibration damper 100. Centrifugal force pendulum 125 has a pendulum flange 140 and one or more pendulum masses 145 which are movably attached to the pendulum flange 140 in a plane 146 of rotation of the pendulum flange.

FIG. 1b depicts a variant in which a pendulum flange 240 takes the place of the output flange 120 depicted above. In this case, the pendulum flange 240 used in the upper embodiment is replaced by an intermediate flange 250. In other respects, the statements made above about the other embodiment are valid. In an analogous embodiment, the pendulum flange 240 can also take the place of the input flange 210, in which case the first elastic element 230 couples the pendulum flange 240 with the intermediate flange 250 and the second elastic element 235 couples the intermediate flange 250 with the output flange 220.

Figure 2A:
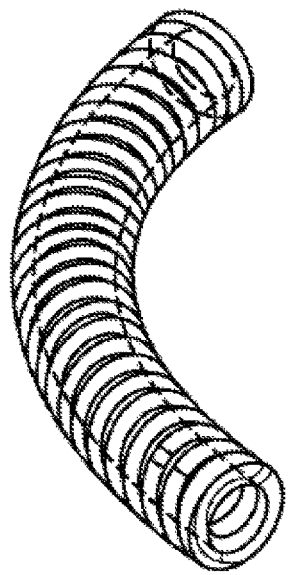
FIGS. 2a to 2d a bow spring for use on the vibration dampers of FIGS. 1a to 1c.
Figure 2B:
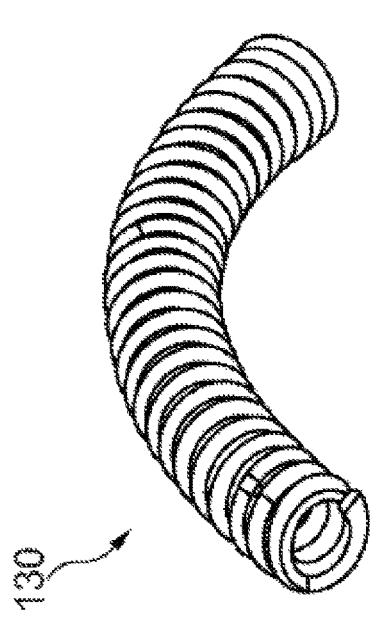
Figure 2C:
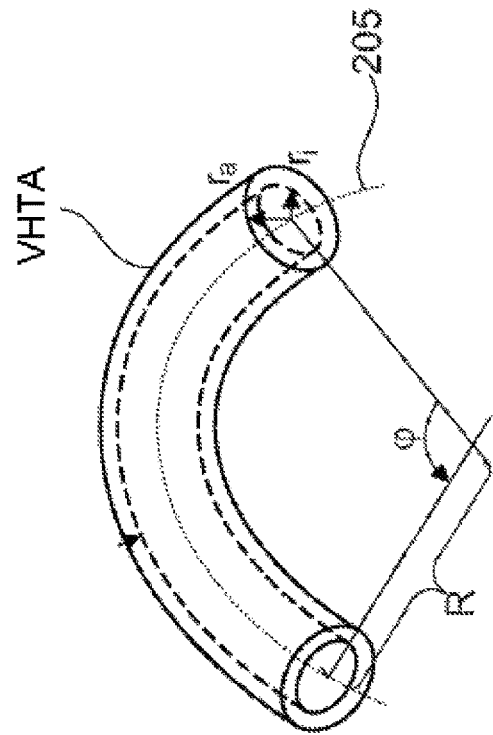
Figure 2D:
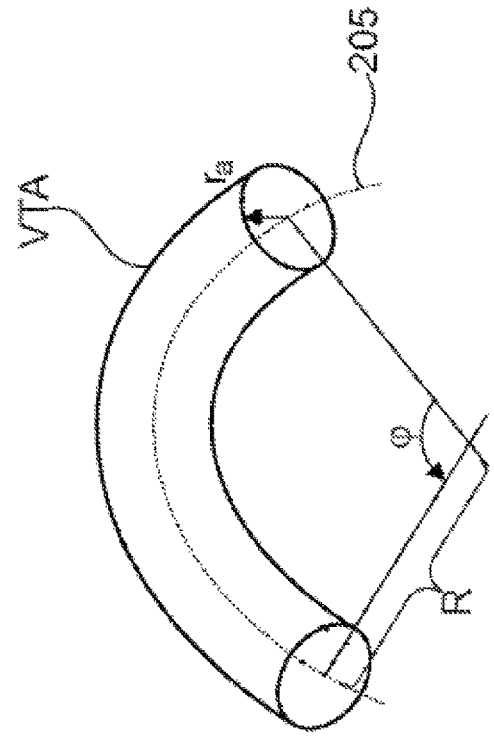

FIGS. 2a to 2d show the first elastic element 130, which is designed as a bow spring. In FIG. 2a, only the elastic element 130 is shown, in FIG. 2b the elastic element 130 together with an enveloping geometric figure, in FIG. 2c only the solid cylindrical geometric figure, and in FIG. 2d only the hollow cylindrical geometric figure.

The first elastic element 130 is formed by a steel wire which is wound helically around a circular line 205. The first elastic element 130 extends inside a solid torus sector VTA. The volume VT of a solid torus is stated as follows:

$$VT = 2\pi^2 R r_a^2 \quad \text{(Equation 1)}$$

where:
VT volume of the solid torus
R radius of the centerline
$r_a$ radius of the cross section of the solid torus.

The volume of the solid torus sector is determined as a fraction of the volume of the solid torus.

$$VTA = \frac{\varphi}{360°} \cdot VT \quad \text{(Equation 2)}$$

where:
VTA volume of the solid torus sector
VT volume of the solid torus.

In particular, when the first elastic element 130 comprises a plurality of concentric coil springs, the volume of the first elastic element 130 can be approximated as the volume of the described solid torus sector. If the wire of the first elastic element 130 encircles a considerable volume that is not filled by another section of the first elastic element 130, then the volume of the first elastic element can also be approximated as the volume of a hollow torus sector. The volume of a hollow torus is determined as follows:

$$VHT = 2\pi^2 R(r_a^2 - r_i^2) \quad \text{(Equation 3)}$$

where:
VHT volume of the hollow torus
R radius of the centerline
$r_a$ outer radius of the cross section of the solid torus
$r_i$ inside radius of the cross section of the solid torus.

In turn, the volume of a hollow torus sector is determined as a fraction of the volume of the entire hollow torus.

$$VHTA = \frac{\varphi}{360°} \cdot VHT \quad \text{(Equation 4)}$$

where:
VHTA volume of the hollow torus sector
VHT volume of the hollow torus
φ opening angle of the torus sector.

FIG. 3a shows the second elastic element 135 from FIG. 1 as a straight cylindrical spring. Similarly to the description above referring to the first elastic element 130, the volume of the second elastic element 135 can be approximated by an enveloping geometric body. In the case of the second elastic element 135, this geometric body is a straight circular cylinder. This approach suggests itself in particular when the second elastic element 135 comprises two mutually coaxial coil springs 135a, 135b, as shown in FIG. 3b, so that no appreciable space remains on a radial inner side of the second elastic element 135. The volume of the solid cylinder 135c, which is depicted in FIG. 3b, is determined as follows:

$$VZ = \pi \cdot l \cdot r_a^2 \quad \text{(Equation 5)}$$

where:
VZ volume of the solid cylinder
l length of the solid cylinder
$r_a$ radius of the solid cylinder.

If a coaxial cylindrical cavity is to be considered which is not filled by an element or by a section of the second elastic element 135, then the volume of the second elastic element 135 can also be approximated by a hollow cylinder. The volume of the hollow cylinder is determined as follows:

$$VHZ = \pi \cdot l \cdot (r_a^2 - r_i^2) \quad \text{(Equation 6)}$$

where:
VHZ volume of the hollow cylinder
$r_a$ outside diameter of the hollow cylinder
$r_i$ inside diameter of the hollow cylinder.

FIG. 4 shows an embodiment of the centrifugal force pendulum 125 from FIG. 1. For reasons of illustration, only one pendulum mass 145 is depicted on the pendulum flange 140. Contrary to the depiction, each pendulum mass 145 usually comprises two individual masses, which are attached to opposing axial sides of the pendulum flange 140 and are rigidly connected to each other. Furthermore, usually two, three, four or more pendulum masses 145 are distributed on a circumference around the axis of rotation of the pendulum flange 140. The volumes of the pendulum masses 145 can be determined on the basis of their total mass and their specific weight. The total mass can be specified by a manufacturer of the centrifugal force pendulum 125. Alternative possibilities are a geometric approximation of a hydraulic displacement measurement of the pendulum masses 145 separate from the pendulum flange 140. When the displacement is measured, the volume of the pendulum masses 145 is determined as the volume that they displace when completely immersed in a hydraulic fluid.

On the basis of the volumes described above and the masses of the pendulum masses 145 and the spring elements 130, 135, certain mathematical ratios can now be derived which are useful for assessing the vibration damper 100 from FIG. 1. In extensive series of tests with elastic elements 130, 135 of different sizes and weights and pendulum masses 145 of different sizes and weights it has been found that the properties of the vibration damping or vibration suppression of the vibration damper 100 are especially good when at least one of the ratios that are indicated in columns in the following table lies within a range that is specified in the respective lines below as minimum and maximum.

|  | Q1 = MPM/MEL | Q2 = VPM/VZT | Q3 = VPM/VHZT | Q4 = Q1/Q3 |
| --- | --- | --- | --- | --- |
| Maximum | 4 | 1.3 | 4 | 2 |
| Minimum | 0.5 | 0.3 | 0.5 | 0.35 |

The following second table specifies even stricter minimum and maximum values for the ratios Q1 through Q4. In these ranges even greater improvement of the quality of the vibration damper 100 can be expected.

|  | Q1 = MPM/MEL | Q2 = VPM/VZT | Q3 = VPM/VHZT | Q4 = Q1/Q3 |
| --- | --- | --- | --- | --- |
| Maximum | 1.60 | 0.63 | 1.94 | 1.05 |
| Minimum | 0.95 | 0.44 | 0.97 | 0.72 |

The quality of the vibration damper 100 can exist when one of the ratios Q1 through Q4 lies in a range assigned to it by one of the tables, or when a plurality of the ratios Q1 through Q4 lie in the ranges assigned to them. A simple and rapid determination of the quality of an existing or planned vibration damper 100 can be carried out on the basis of these specifications.

REFERENCE LABELS 100 vibration damper
105 input side
110 input flange
115 output side
120 output flange
125 centrifugal force pendulum
130 first elastic element
135 second elastic element
140 pendulum flange
145 pendulum mass
150 intermediate flange
205 circular line

ACRONYMS

MEL=sum of the masses of the at least one elastic element.
MPM=sum of the masses of the at least one pendulum mass.
VPM=sum of the volumes of the at least one pendulum mass.
VZT=sum of the volumes of the solid cylinder and the solid torus sectors.
VHZT=sum of the volumes of the hollow cylinder and the hollow torus sectors.
VTA=volume of the solid torus sector.
VT=volume of the solid torus.
VHTA=volume of the hollow torus sector.
VHT=volume of the hollow torus.

What is claimed is:

1. A vibration damper comprising:
   an input side;
   an output side;
   at least one elastic element for transferring force between the input side and the output side;
   wherein each of the at least one elastic element extends within a cylinder or a torus sector;
   a centrifugal force pendulum having a pendulum flange and at least one pendulum mass movably attached to the pendulum flange in a plane of rotation of the pendulum flange, wherein:

$Q1=MPM/MEL=(0.5 \ldots 4)$, where MEL=sum of the masses of the at least one elastic element
   and MPM=sum of the masses of the at least one pendulum mass.

2. The vibration damper as recited in claim 1 wherein Q1=(0.95 . . . 1.60).

3. The vibration damper as recited in claim 1 wherein the at least one elastic element includes bow springs.

4. The vibration damper as recited in claim 1 wherein the at least one elastic element includes straight springs.

5. A vibration damper comprising:
   an input side;
   an output side;
   at least one elastic element for transferring force between the input side and the output side;
   wherein each of the at least one elastic element extends within a solid cylinder or a solid torus sector;
   a centrifugal force pendulum having a pendulum flange and at least one pendulum mass movably attached to the pendulum flange in a plane of rotation of the pendulum flange, wherein:

$Q2=VPM/VZT=(0.3 \ldots 1.3)$, where VPM=sum of the volumes of the at least one pendulum mass
   and VZT=sum of the volumes of the solid cylinder and the solid torus sectors.

6. The vibration damper as recited in claim 5 wherein Q1=(0.44 ... 0.63).

7. The vibration damper as recited in claim 5 wherein the at least one elastic element includes two mutually coaxial coil springs.

8. A vibration damper comprising:
an input side;
an output side;
at least one elastic element for transferring force between the input side and the output side, wherein each of the at least one elastic elements extends along a hollow cylinder or a hollow torus sector;
a centrifugal force pendulum having a pendulum flange and at least one pendulum mass movably attached to the pendulum flange in a plane of rotation of the pendulum flange,
characterized in that:

$$Q3=VPM/VHZT=(0.5 \ldots 4),$$

where VPM=sum of the volumes of the at least one pendulum mass
and VHZT=sum of the volumes of the hollow cylinder and the hollow torus sectors.

9. The vibration damper as recited in claim 8 wherein Q3=(0.97 ... 1.94).

10. A vibration damper comprising:
an input side;
an output side;
at least one elastic element for transferring force between the input side and the output side; wherein each of the at least one elastic element extends along a hollow cylinder or a hollow torus sector;
a centrifugal force pendulum having a pendulum flange and at least one pendulum mass movably attached to the pendulum flange in a plane of rotation of the pendulum flange,
wherein:

$$Q4=Q1/Q3=(0.35 \ldots 2),$$

where Q1=MEL/MPM,
MEL=sum of the masses of the at least one elastic elements;
MPM=sum of the masses of the at least one pendulum mass;
Q3=VPM/VHZT
VPM=sum of the volumes of the at least one pendulum mass;
and VHZT=sum of the volumes of the hollow cylinder and the hollow torus sectors.

11. The vibration damper as recited in claim 10 wherein Q4=(0.72 ... 1.05).

* * * * *